(12) United States Patent
Jenkins

(10) Patent No.: US 10,672,242 B2
(45) Date of Patent: Jun. 2, 2020

(54) PROXIMITY BASED SECURITY MONITORING

(71) Applicant: Vivint, Inc., Provo, UT (US)

(72) Inventor: Harrison Taylor Jenkins, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 211 days.

(21) Appl. No.: 14/885,522

(22) Filed: Oct. 16, 2015

(65) Prior Publication Data

US 2017/0109985 A1 Apr. 20, 2017

(51) Int. Cl.
| | |
|---|---|
| *G08B 13/14* | (2006.01) |
| *G08B 21/02* | (2006.01) |
| *G08B 25/14* | (2006.01) |
| G08B 21/18 | (2006.01) |
| G08B 25/00 | (2006.01) |
| H04W 4/38 | (2018.01) |

(Continued)

(52) U.S. Cl.
CPC ......... *G08B 13/1427* (2013.01); *G08B 21/02* (2013.01); *G08B 21/0225* (2013.01); *G08B 21/0227* (2013.01); *G08B 21/0244* (2013.01); *G08B 13/00* (2013.01); *G08B 21/0272* (2013.01); *G08B 21/18* (2013.01); *G08B 25/008* (2013.01); *G08B 25/016* (2013.01); *G08B 25/14* (2013.01); *H04W 4/38* (2018.02); *H04W 40/248* (2013.01); *H04W 52/0235* (2013.01)

(58) Field of Classification Search
CPC ........ G06F 23/552; G06F 21/88; G01S 17/06; G01S 7/4808; G08B 13/1427; G08B 13/1436; G08B 13/149; G08B 21/0286; G08B 25/14; G08B 13/06; G08B 13/14; G08B 13/19608; G08B 13/19684; G08B 13/19691; G08B 13/22; G08B 21/0216; G08B 21/0247; G08B 21/22; G08B 29/046

See application file for complete search history.

(56) References Cited

U.S. PATENT DOCUMENTS

| | | | |
|---|---|---|---|
| 6,236,333 B1 * | 5/2001 | King | B60R 25/2036 340/10.1 |
| 7,796,035 B2 | 9/2010 | Hallbert et al. | |

(Continued)

OTHER PUBLICATIONS

DeWalt, DeWalt Mobile Lock, obtained from http://www.dewaltmobilelock.com/, available as early as 2013.

(Continued)

*Primary Examiner* — Benyam Haile
*Assistant Examiner* — Renee Dorsey
(74) *Attorney, Agent, or Firm* — Holland & Hart, LLP

(57) ABSTRACT

In one embodiment, a method to monitor a proximity of an item within the confines of an automation system is described. The method may comprise setting one or more monitoring thresholds for an item. The monitoring threshold factors are communicating by a sensor proximate the item. The method may receive one or more notifications via the sensor that the item has exceeded at least one monitoring threshold and activating a monitoring aspect of the sensors based at least in part on the receiving. The method may monitor the item for one or more alarm thresholds based at least in part on the receiving. One or more alarms may be activated based at least in part on the monitoring.

20 Claims, 7 Drawing Sheets

(51) Int. Cl.
  *H04W 52/02* (2009.01)
  *G08B 25/01* (2006.01)
  *G08B 13/00* (2006.01)
  *H04W 40/24* (2009.01)

(56) References Cited

U.S. PATENT DOCUMENTS

| | | | |
|---|---|---|---|
| 8,253,554 B2 | 8/2012 | Wang et al. | |
| 8,339,263 B2 * | 12/2012 | Paananen | G08B 13/14 340/568.1 |
| 2002/0021231 A1 | 2/2002 | Schlager et al. | |
| 2002/0113705 A1 * | 8/2002 | Wallace | G08B 6/00 340/568.7 |
| 2003/0208692 A9 * | 11/2003 | Kimmel | G08B 13/19 340/511 |
| 2004/0155777 A1 * | 8/2004 | Mitchell | G08B 13/1427 340/568.1 |
| 2005/0128080 A1 * | 6/2005 | Hall | B65D 7/00 340/539.26 |
| 2005/0184870 A1 * | 8/2005 | Galperin | G08B 13/2462 340/568.2 |
| 2006/0265195 A1 * | 11/2006 | Woodard | G08B 25/08 702/188 |
| 2008/0117072 A1 * | 5/2008 | Hallbert | G06F 21/552 340/670 |
| 2010/0013639 A1 | 1/2010 | Revert | |
| 2010/0170811 A1 * | 7/2010 | Coppiardi | G10G 7/005 206/14 |
| 2010/0315207 A1 * | 12/2010 | Bullard | H04L 43/065 340/286.02 |
| 2011/0193677 A1 * | 8/2011 | Ho | H04W 12/10 340/3.1 |
| 2012/0307049 A1 * | 12/2012 | Mimar | G08B 13/19676 348/143 |
| 2013/0312984 A1 * | 11/2013 | Piegari | A62C 2/00 169/45 |
| 2014/0081531 A1 * | 3/2014 | Smith | G01S 17/42 701/50 |
| 2014/0218194 A1 * | 8/2014 | Gruber | G08B 25/14 340/540 |
| 2014/0266764 A1 * | 9/2014 | Henrie | G08B 5/38 340/691.1 |
| 2015/0056979 A1 * | 2/2015 | Davis | G08C 17/02 455/420 |
| 2016/0196730 A1 * | 7/2016 | Pandey | G08B 29/06 340/650 |
| 2016/0303443 A1 * | 10/2016 | Boggs | A63B 69/3685 |

OTHER PUBLICATIONS

Tile, Inc., Tile, obtained from https://www.thetileapp.com/, available as early as Oct. 2014.

* cited by examiner

PROXIMITY BASED SECURITY MONITORING

BACKGROUND

The present disclosure, for example, relates to security and/or automation systems, and more particularly to monitor items for security reasons based on proximity.

Security and automation systems are widely deployed to provide various types of communication and functional features such as monitoring, communication, notification, and/or others. These systems may be capable of supporting communication with a user through a communication connection or a system management action.

Many homes and businesses have items of value. Items of value may be more susceptible to unethical acquisition due to their value and mobility. Effectively tracking the location of these items may be problematic. As such, the items may be stolen without the owner being notified or having any ability to effectively recover the item.

SUMMARY

The disclosure contained herein may describe one or more aspects of monitoring the safety of an item within the confines of an automation system. The item may be monitored using one or more sensors proximate the item and a control panel associated with the automation system.

In one embodiment, a method for security and/or automation systems is disclosed. The method may comprise setting one or more monitoring thresholds for an item. The monitoring threshold factors are communicating by a sensor proximate the item. The method may include receiving one or more notifications via the sensor that the item has exceeded at least one monitoring threshold and activating a monitoring aspect of the sensors based at least in part on the receiving. The method may include monitoring the item for one or more alarm thresholds based at least in part on the receiving. One or more alarms may be activated based at least in part on the monitoring.

In some embodiments, the method may further comprise deactivating the one or more alarms from a control panel. One or more of the monitoring thresholds may comprise a predetermined distance from a control panel. A distance between the item and the control panel may be calculated. The sensor may communicate with the control panel using a radio frequency. The control panel may use a speed of the radio frequency to calculate the distance between the sensor and the control panel.

In further embodiments, the control panel may receive Global Positioning System (GPS) information from a GPS sensor affixed to the item and determine if the item satisfies one or more alarm thresholds based at least in part on the receiving. In some instances, the monitoring thresholds may comprise one or more of a distance threshold, movement threshold, or motion threshold. The sensor may comprise at least a user interface, motion detection unit, and communication unit.

In some embodiments, one or more authorities may be contacted based at least in part on the activating. A user of the automation system may be alerted based at least in part on the activating; and feedback may be requested from the user to deactivate the alarm or contact an authority.

In alternative embodiments, a control panel is disclosed. The apparatus may comprise a processor, memory in electronic communication with the processor; and instructions stored in the memory. The instructions may be executable by the processor to set one or more monitoring thresholds for an item. The monitoring thresholds are executed by a sensor proximate the item. The instructions may be executable by the processor to receive one or more notifications via the sensor that the item has exceeded at least one monitoring threshold and monitor the item for one or more alarm thresholds based at least in part on the receiving. The instructions may be executable by the processor to activate one or more alarms based at least in part on the monitoring.

In further embodiments, a non-transitory computer-readable medium storing computer-executable code for wireless communication is disclosed. The code may be executable by a processor to set one or more monitoring thresholds for an item, wherein the monitoring thresholds are executed by a sensor proximate the item. The code may be executable by a processor to receive one or more notifications via the sensor that the item has exceeded at least one monitoring threshold and monitor the item for one or more alarm thresholds based at least in part on the receiving. The code may be additionally executable by a processor to activate one or more alarms based at least in part on the monitoring.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Many homes and businesses have items of value to the occupants, owner, users, and the like. For example, business and homes may have items of a high monetary value such as grills, inventory, sporting equipment, vehicles, televisions, game consoles, computers, bicycles, lawnmowers, snow blowers, ski rack, trailers, etc. In some embodiments, items may have a high personal value. For example, a present from a deceased relative, photos of children, and the like. These items may be more susceptible to unethical acquisition due to their value and mobility. In some instances, the items of value to the owner may be equipped with a sensor to detect when the items may be moved without authorization and/or permission.

Monitoring items which may be subject to theft may comprise tracking the item with one or more sensors associated with an automation system. The sensor may be proximate and/or affixed to the item and may connect to an automation system. The sensor and the automation system may determine if an item is being misappropriated.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
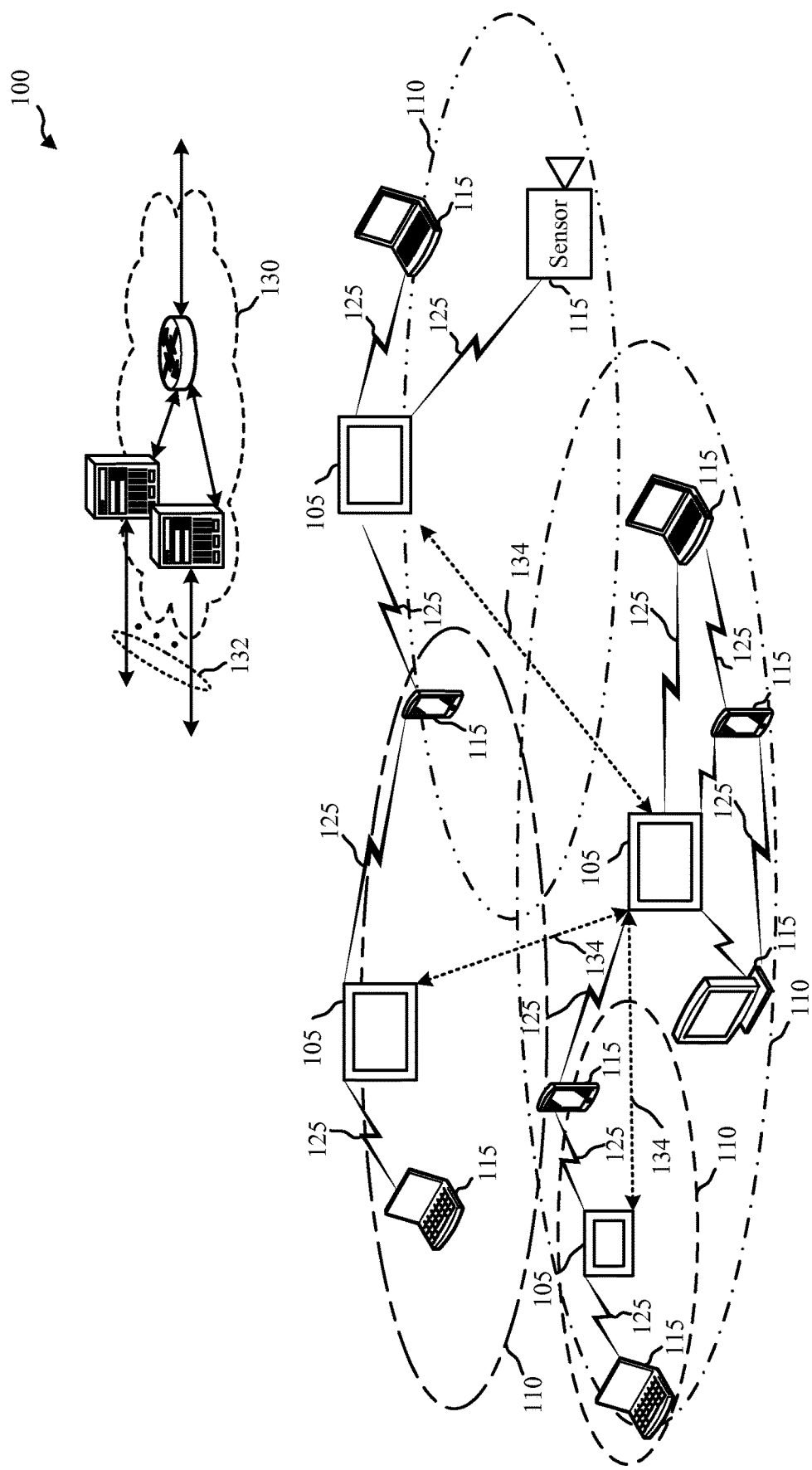
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 and may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A device 115 may also include or be referred to by those skilled in the art as a user device, a sensor, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A device 115 may include and/or be one or more sensors that sense: proximity, motion, temperatures, humidity, sound level, smoke, structural features (e.g. glass breaking, window position, door position), time, geo-location data of a user and/or a device, distance, biometrics, weight, speed, height, size, preferences, light, darkness, weather, time, system performance, and/or other inputs that relate to a security and/or an automation system. In some embodiments, the sensor may comprise one or more sensors to perform multiple functions. In further embodiments, the sensor may comprise one or more functions. For example, the sensor may comprise a user interface, a motion detection unit, and a communication unit. The user interface may allow a user to enter information into the sensor to activate it, deactivate it, shut off an alarm, and the like. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, Bluetooth, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, the sensors 115 may be proximate one or more items 115 in the communication system 100. The sensors 115 may work in conjunction with one or more control panels 105. The sensor 115 may be in a sleep state until the sensor 115 is activated by movement of the item 115. Once the sensor 115 detects motion of the item 115, the sensor may turn on and begin communicating with the control panel 105 to determine if the item 115 is being stolen.

Figure 2:
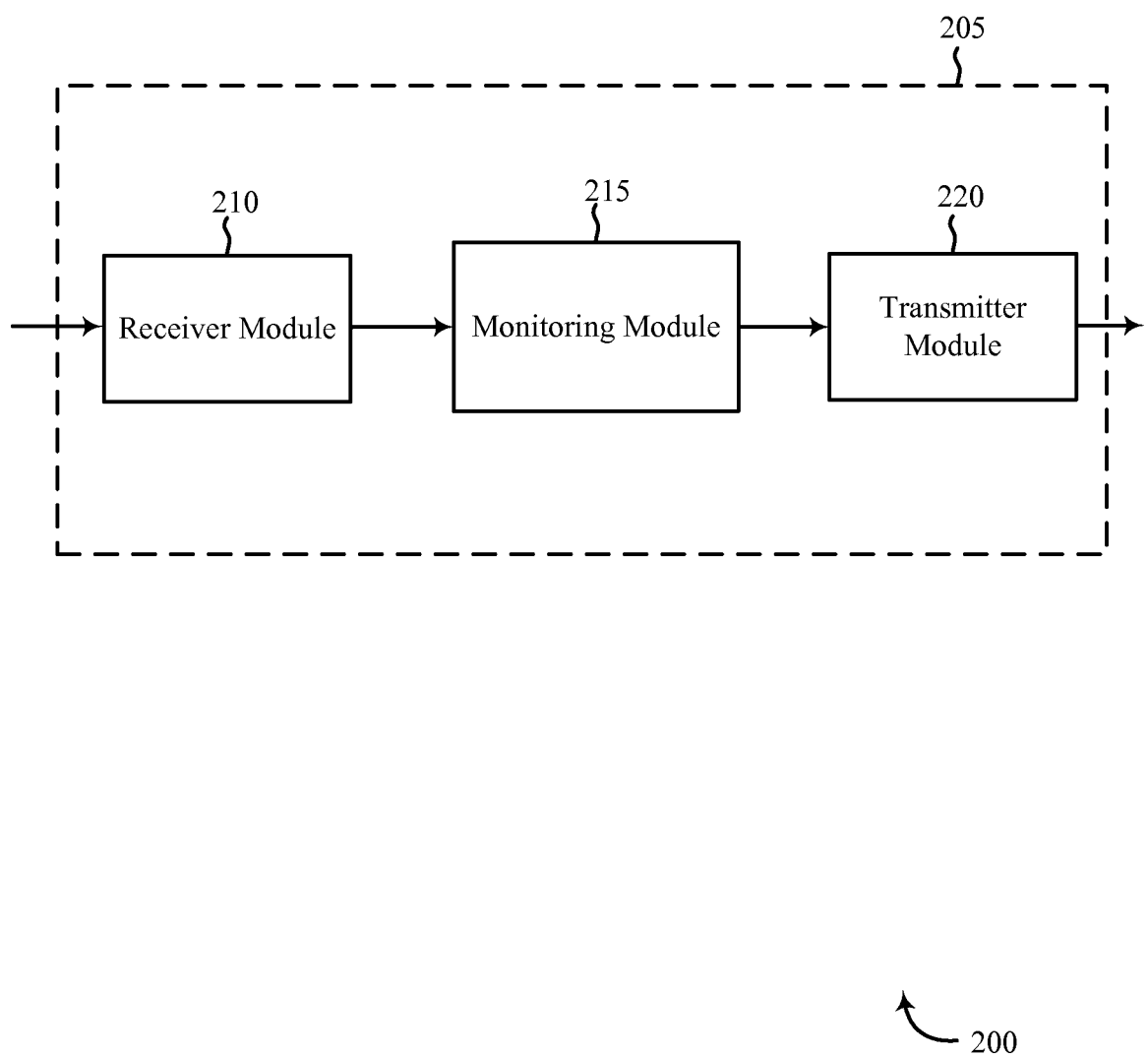
FIG. 2 shows a block diagram of a device relating to a monitoring an item within the boundaries of an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 105 described with reference to FIG. 1. The control panel 205 may include a receiver module 210, a monitoring module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive information from one or more sensors. For example, the receiver module 210 may receive motion information, location information, return message information, and the like Information may be passed on to the monitoring module 215, and to other components of the control panel 205.

The monitoring module 215 may monitor one or more sensors associated with items of value to a user. The sensors may be one example of sensors 115 of FIG. 1. The sensors may be affixed, glued, coupled, tied, or otherwise proximate any items the user wishes to monitor. The monitoring module 215 may set monitoring thresholds for one or more sensors. The monitoring thresholds may comprise movement thresholds, distance thresholds, motion thresholds, or the like. The monitoring module 215 may link to and receive relative information from each sensor(s) associated with a tracked item. Depending upon the information received and one or more monitoring and/or alarm thresholds set for each item, the monitoring module 215 may alert an administrator of the automation system and/or activate one or more alarms. The alarm may be an audible alarm. The alarm may sound on the automation system generally, on the sensor and the automation system, or some combination thereof. The monitoring module 215 may additionally deactivate the alarm and/or sensor.

The transmitter module 220 may transmit the one or more signals received from other components of the control panel 205 The transmitter module 220 may transmit information back to the sensor, to a server of the automation system, to an administrator, or the like. For example, the transmitter module 220 may request information from the sensor such as location information. The transmitter module 220 may also communicate activation functions to the sensor (i.e. turn on, turn off, sound alarm, etc.). In some embodiments, the transmitter module 220 may communicate information to an administrator. For example, the transmitter module 220 may send an alarm alert to an administrator, provide status information, or the like. In some examples the transmitter module 220 may be collocated with the receiver module 210 in a transceiver module.

Figure 3:
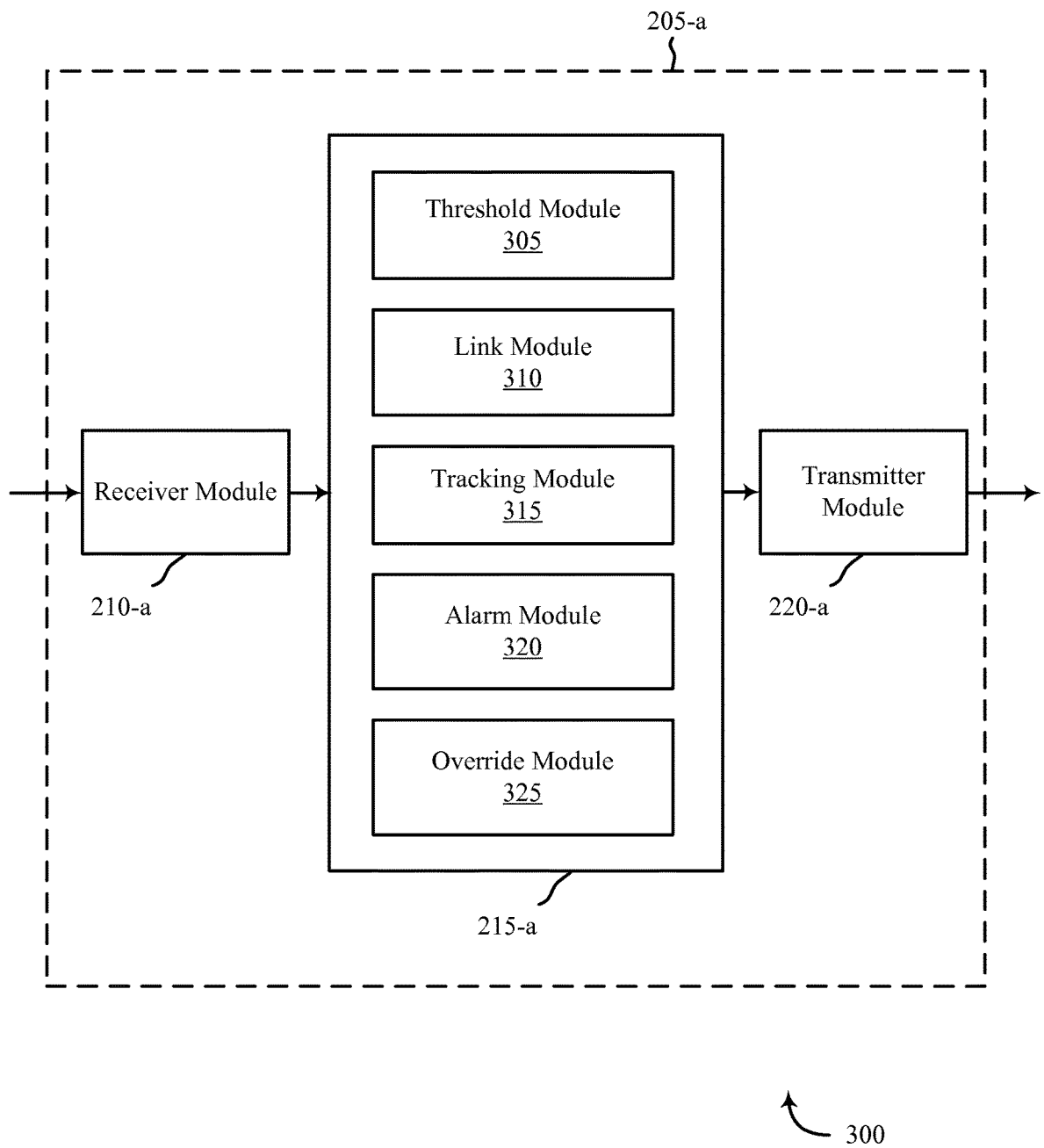
FIG. 3 shows a block diagram of a device relating to a monitoring an item within the boundaries of an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, a monitoring module 215-a, and/or a transmitter module 220-a, which may be examples of the corresponding modules of control panel 205. The control panel 205-a may also include a processor. Each of these components may be in communication with each other. The monitoring module 215-a may comprise a threshold module 305, a link module 310, a tracking module 315, an alarm module 320, and an override module 325. The receiver module 210-a and the transmitter module 220-a may perform the functions of the receiver module 210 and the transmitter module 220, of FIG. 2, respectively.

The components of the control panel 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The threshold module 305 may establish one or more monitoring thresholds associated with a sensor and one or more alarm thresholds associated with an item. An administrator and/or user of an automation system may wish to proactively monitor the status of one or more items within the confines of the automation system. The item(s) may be proximate a sensor. For example, a sensor may be adhered, coupled, affixed, or otherwise attached to an item. In another embodiment, one or more sensors may be used to monitor a single item. For example, a sensor affixed to the item may be in communication with a sensor associated with a base location, or a home location of the item. Each sensor may have certain limitations before the sensors will turn on, communicate with the control panel 205-*a*, sound an alarm, and the like.

The sensor may comprise one or more monitoring thresholds. The monitoring thresholds may determine when an item may require monitoring for unauthorized acquisition. One monitoring threshold may comprise a secure zone wherein the item is at a resting location. The secure zone may comprise a small area of square footage, such as an area surrounding a bicycle or lawnmower. The secure zone may also be a larger area, such as a home or commercial location for more mobile devices such as a laptop. The sensor may detect when the item has moved beyond the secure zone and requires further monitoring. Additionally, a monitoring threshold may be any movement in general. Movement of a particular item may require monitoring when the item should not be moved or when a sensor may be deactivated prior to utilizing the item. Another monitoring threshold may comprise a two or more sensor system. For example, a sensor on the item may connect with a sensor at a base location. The two sensors may determine when an item is deemed safe and at its proper location. When the sensors can no longer connect or outside a distance range of each other, the monitoring threshold may be met and the sensor may alert the control panel 205-*a* that the item requires further monitoring.

The monitoring thresholds may enable the sensor to stay largely in a sleep mode. For example, the sensor may be essentially turned off to conserve battery power. However, the sensor may activate based upon movement and may initiate a signal to the control panel 205-*a* of the newly activated "on" state. The control panel 205-*a* may respond in kind by by activating a monitoring aspect or unit of the sensors. The monitoring aspect of the sensors may comprise turning on one or more modules within the sensors, running a series of code to activate the sensors, and the like. These actions may allow the automation system to passively track the location of the item. For example, the automation system may not continuously track the location of the sensor. Doing so may waste battery life. To counteract this situation, the sensor may remain in the off or sleep mode until one or more motions and/or vibrations cause the sensor to activate.

The alarm thresholds may set a series of thresholds to satisfy prior to activating one or more alarms. The alarm thresholds may comprise a distance threshold, a time threshold, a movement threshold, and the like. The distance threshold may provide predetermined limitations on the distance the item may travel from the control panel 205-*a*, the base location, or the automation system generally. The movement threshold may provide limits on the total amount of motion allowed of a certain item. For example, certain items may generally not be moved with any frequency or duration. Example are paintings, statues, plants, and the like. These items typically are not moved but may be subject to unauthorized acquisition. Therefore, a user may wish to monitor its location to determine its safety. The time threshold may limit the amount of time an item may be in motion. For example, some items may be moved frequently for short durations. A user may wish to set a time threshold to avoid unnecessarily sounding an alarm. One example may comprise a lawnmower. A user may typically mow their lawn within a predetermined time. The time threshold may not be met until that time limit has been exceeded. Another example may be moving inventory within a store location. In some embodiments, a sensor may comprise multiple alarm thresholds. For example, a lawnmower may have a time threshold coupled with a distance threshold. If the lawnmower appears to be exiting the area associated with the automation system, the alarm thresholds may be satisfied.

The link module 310 may establish or reestablish one or more links with a sensor. In some embodiments, the sensor may be battery powered. The sensor may remain in a largely inactive state until a monitoring threshold is satisfied. Once the sensor is turned on, it may need to connect to the control panel 205-*a*. The link module 310 may oversee this connection and additionally may activate one or more monitoring aspects or units in the sensor. This may allow the sensor to remain on while traveling with an item if an item is in motion. The link module 310 may facilitate communication with the sensor.

Once the link module 310 has established a connection with an active sensor(s), the tracking module 315 may track one or more aspects of the sensor to determine if one or more alarm thresholds are exceeded. If the alarm threshold is a distance or perimeter, the tracking module 315 may determine the location of the sensor to determine if the alarm threshold is exceeded. For example, the sensor may comprise one or more location sensing technologies such as a GPS, or the like. In another embodiment, the tracking module 315 may track the overall distance between the sensor and the control panel 205-*a* by tracking the amount of time between messages/communications with the sensor. In some instances, the sensor and the control panel 205-*a* may communicate using one or more radio technologies. Radio waves may travel at a predetermined speed. The speed may be measured in distance traveled per time unit. For example, radio waves may travel at roughly the speed of light with some variations. The base station may use the travel speed and the time to conclude a distance between the base station and the sensor. If the distance to the control panel 205-*a* surpasses the alarm threshold, the tracking module 315 may alert the alarm module 320. The tracking module 315 may also track the amount and/or length of time the sensor is active.

Additionally, the tracking module 315 may track the amount of motion occurring as an alarm threshold. The amount of motion may be a force of motion or a total cumulative motion, or the like. If a user has an expensive painting or other wall-mounted item, the tracking module 315 may determine the amount of force used to move the object. The tracking module 315 may determine the amount of force is equivalent to a theft or other unlawful acquisition. Additionally, the amount of movement may be tracked. For example, if a very heavy object, such as a statue or piece of equipment, is slowly being moved, the tracking module 315 may track the cumulative movement to determine the object is slowly being acquisitioned.

The alarm module 320 may activate one or more alarms if an alarm threshold is exceeded or if the tracking module 315 suspects unlawful acts. The alarm module 320 may activate an audible alarm proximate the sensor. The alarm module 320 may also or additionally activate an audible alarm with the automation system generally. The alarm module 320 may send a message to one or more users of the automation system concerning the potential theft of an item. In some embodiments, the alarm module 320 may contact authorities if the alarm is not deactivated after a predetermined amount of time. The alarm may be deactivated by either a tactile input on the sensor, the control panel 205-*a*, or remotely shutting off the alarm by a user.

The override module 325 may allow one or more users to deactivate a sensor and prevent a false alarm. For example, the override module 325 may receive input from one or more users to shut off a sensor, deactivate a sensor, or turn off an alarm. For example, a user may allow a neighbor to borrow a ladder. The user may remotely override or deactivate the sensor to allow the neighbor to borrow the ladder without setting off any alarms. For example, the user may remotely access the automation system using a mobile device and deactivate the sensor. Additionally, the automation system may send an alert to the user of the detected motion and monitoring results. The user may have the option to override the monitoring and turn the sensor off if the user so desires and is aware of authorized or acceptable activity.

Figure 4:
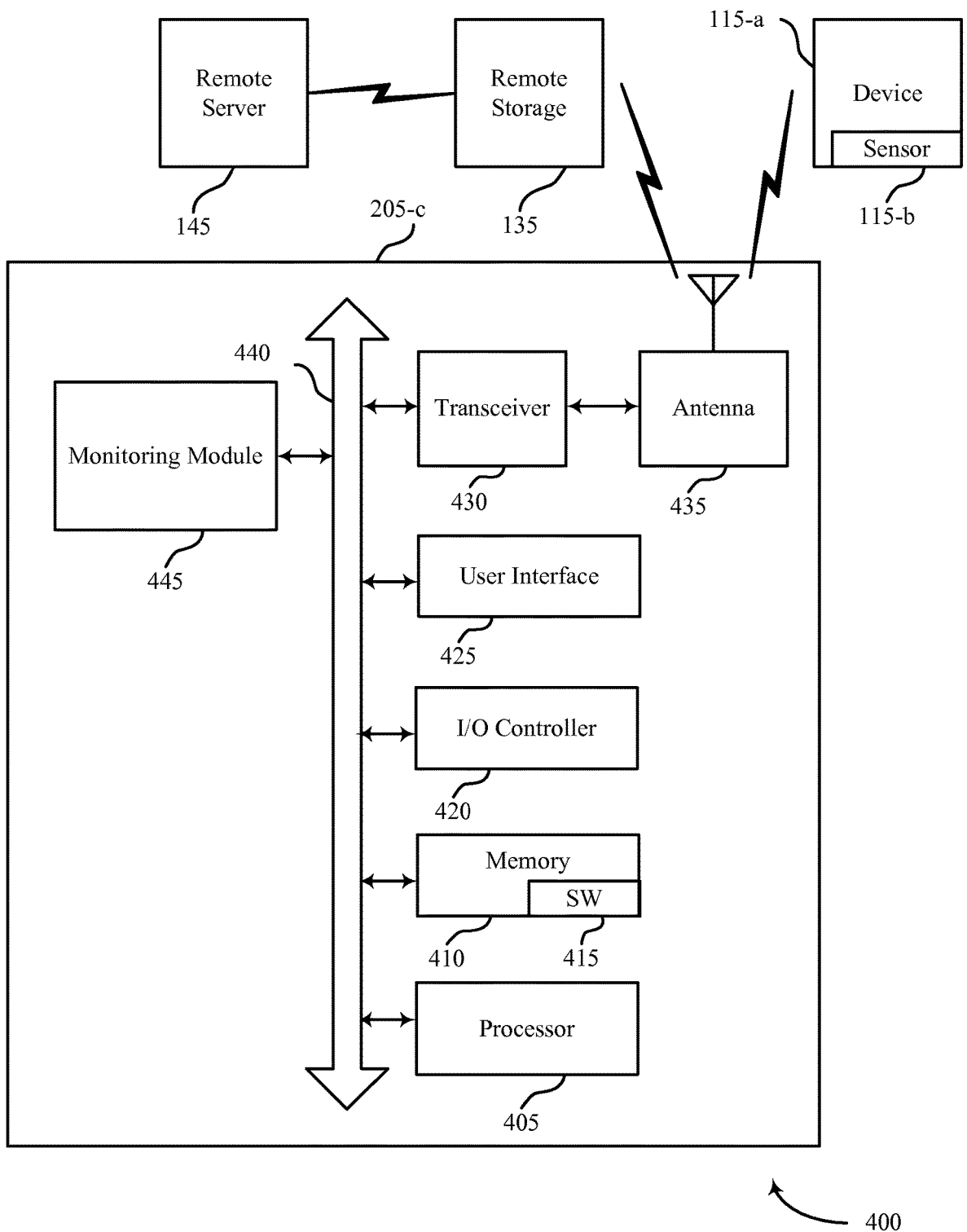
FIG. 4 shows a block diagram relating to a monitoring an item within the boundaries of an automation system, in accordance with various aspects of this disclosure.

FIG. 4 shows a system 400 for use in proximity based monitor systems, in accordance with various examples. System 400 may include a control panel 205-*c*, which may be an example of the control panels 105 of FIG. 1. Control panel 205-*c* may also be an example of one or more aspects of control panels 205 and/or 205-*a* of FIGS. 2 and 3.

Control panel 205-*c* may include monitoring module 445, which may be an example of monitoring module 215 described with reference to FIG. 2. In some embodiments the terms control panel and control device are used synonymously.

Control panel 205-*c* may also include components for bi-directional voice and data communications including components for transmitting communications and components for receiving communications. For example control panel 205-*c* may communicate bi-directionally with one or more of device 115-*a*, one or more sensors 115-*b*, remote storage 135, and/or remote server 145. This bi-directional communication may be direct (e.g., control panel 205-*c* communicating directly with remote storage 135) or indirect (e.g., control panel 205-*c* communicating indirectly with remote server 145 through remote storage 135).

The monitoring module 445 may monitor the location of an item through communication with one or more sensors based at least in part on one or more monitoring thresholds and/or alarm thresholds as described above with reference to FIG. 3. For example, the monitoring module 445 may communicate with a sensor proximate an item to determine the location of the item. The monitoring module 445 may derive the safety of the item by the location of the item. For example, if the item is in a base location or safety zone, the item may be considered safe and adequately protected. However, if the item is moved, transferred, or other handled, the safety of the item may be compromised. Therefore, through various functions of the sensor and the control panel, the control panel may monitor the security of the item.

Control panel 205-*c* may also include a processor module 405, and memory 410 (including software (SW)) 415, an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 135, and/or remote server 145. The transceiver module 430 may include a modem to modulate the packets and provide the modulated packets to the one or more antennas 435 for transmission, and to demodulate packets received from the one or more antenna 435. While a control panel or a control device (e.g., 205-*c*) may include a single antenna 435, the control panel or the control device may also have multiple antennas 435 capable of concurrently transmitting or receiving multiple wired and/or wireless transmissions. In some embodiments, one element of control panel 205-*c* (e.g., one or more antennas 435, transceiver module 430, etc.) may provide a direct connection to a remote server 145 via a direct network link to the Internet via a POP (point of presence). In some embodiments, one element of control panel 205-*c* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information not specific nor exclusive to itself.

In some embodiments, one or more sensors 115-*b* (e.g., motion, proximity sensor, smoke, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller 420).

One or more buses 440 may allow data communication between one or more elements of control panel 205-*c* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., calculating the distance between the control panel and the sensor, activating an audible alarm, etc.). Alternatively, the software/firmware code 415 may not be directly executable by the processor module 405 but may cause a computer (e.g., when compiled and executed) to perform functions described herein.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the monitoring module 445 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the devices 115-a may include a single antenna 435, the devices 115-a may have multiple antennas 435 capable of concurrently transmitting and/or receiving multiple wireless transmissions.

The control panel 105-a may include a monitoring module 215-b, which may perform the functions described above for the monitoring module 215 of control panel 205 of FIGS. 2 and 3. The control panel 105-a may also include other modules and components to perform other tasks and functions associated with the automation system.

The memory 410 may include random access memory (RAM) and read-only memory (ROM). The memory 410 may store computer-readable, computer-executable software/firmware code 415 containing instructions that are configured to, when executed, cause the processor module 405 to perform various functions described herein (e.g., establish a radio connection with one or more sensors, use approximate distances to determine alarm thresholds, etc.). Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

Figure 5:
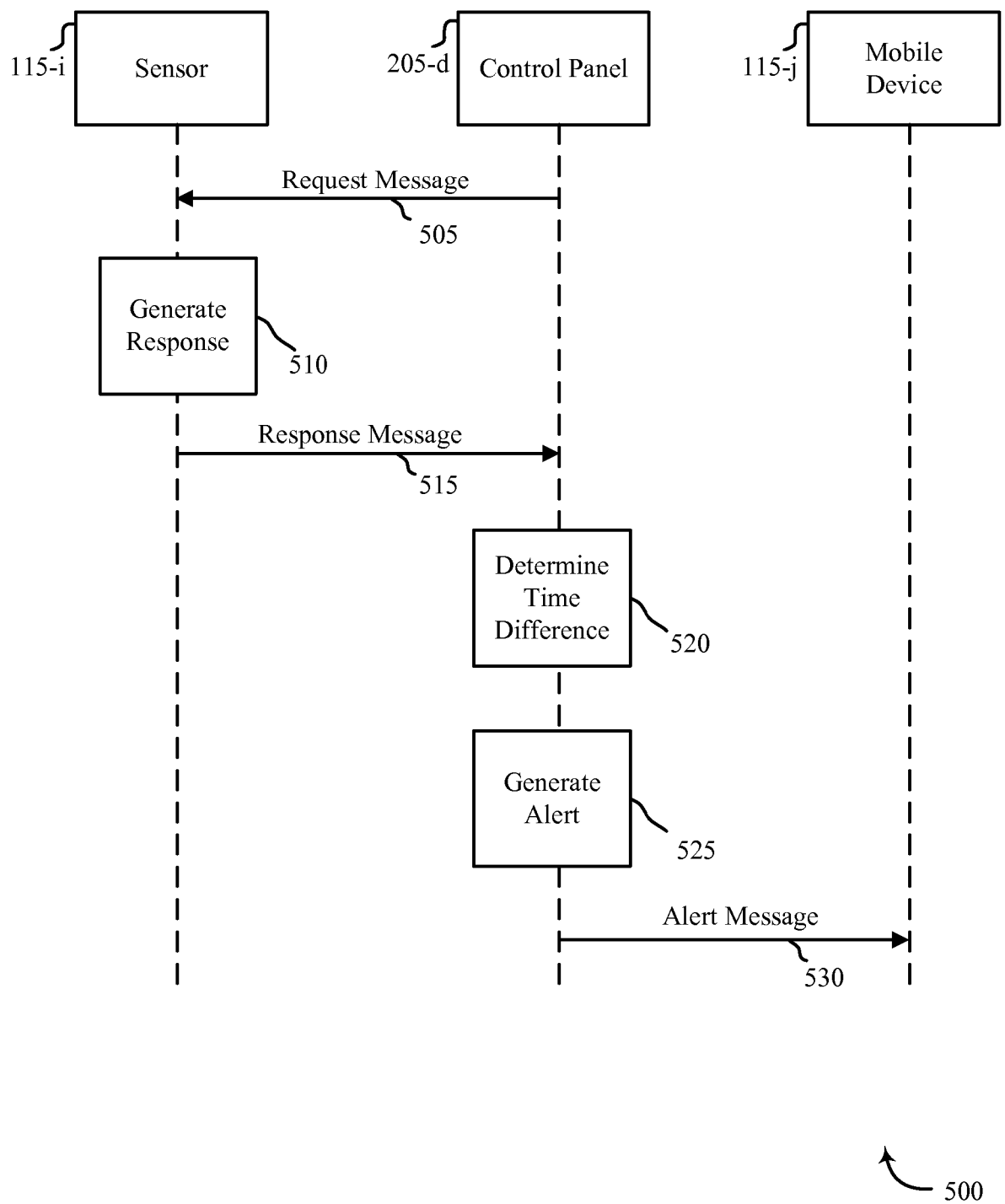
FIG. 5 shows a swim diagram illustrating communications of proximity based monitoring systems, in accordance with various aspects of this disclosure.

FIG. 5 shows a swim diagram 500 illustrating communications in proximity based monitoring systems, in accordance with various examples. The diagram 500 illustrates one or more devices 115-i, 115-j, which may be examples of the devices 115 of FIG. 1. The diagram 500 also illustrates a control panel 205-d, which may an example of control panel 105 of FIG. 1, and/or an example of one or more aspects of control panels 205 of FIGS. 2, 3, and 4.

The device 115-i may be referred to as a sensor. The sensor 115-i may be affixed to one or more items a user of an automation system wishes to track. The sensor 115-i may collect one or more pieces of information. For example, the sensor 115-i may collect motion information, on/off information, alarm information, input information, responses, and the like. In some embodiments, the control panel 205-d may request response information or a ping message from the sensor 115-i by sending a request message 505 to the sensor 115-i. Upon receiving the request message 505, the sensor 115-i may generate a response 510. The sensor 115-i may then transmit a response message 515 back to the control panel 205-d. The response message 515 may include transmit motion information related to the item that is being monitored by the sensor 115-i, on/off information, alarm information, etc. The response message 515 may also be a ping message transmitted to the control panel 205-d. The control panel 205-d may determine the time between sending the request message 505 and receiving the response message 515. The control panel 205-d may determine whether the item has moved.

If the determined time difference indicates the item has moved, the control panel 205-d may generate one or more alert messages 525. The control panel 205-d may communicate an alert message 530 to a mobile device 115-j. The alert message 525 may include information relating to whether the item has satisfied one or more monitoring thresholds, one or more alarm thresholds, and the like.

Figure 6:
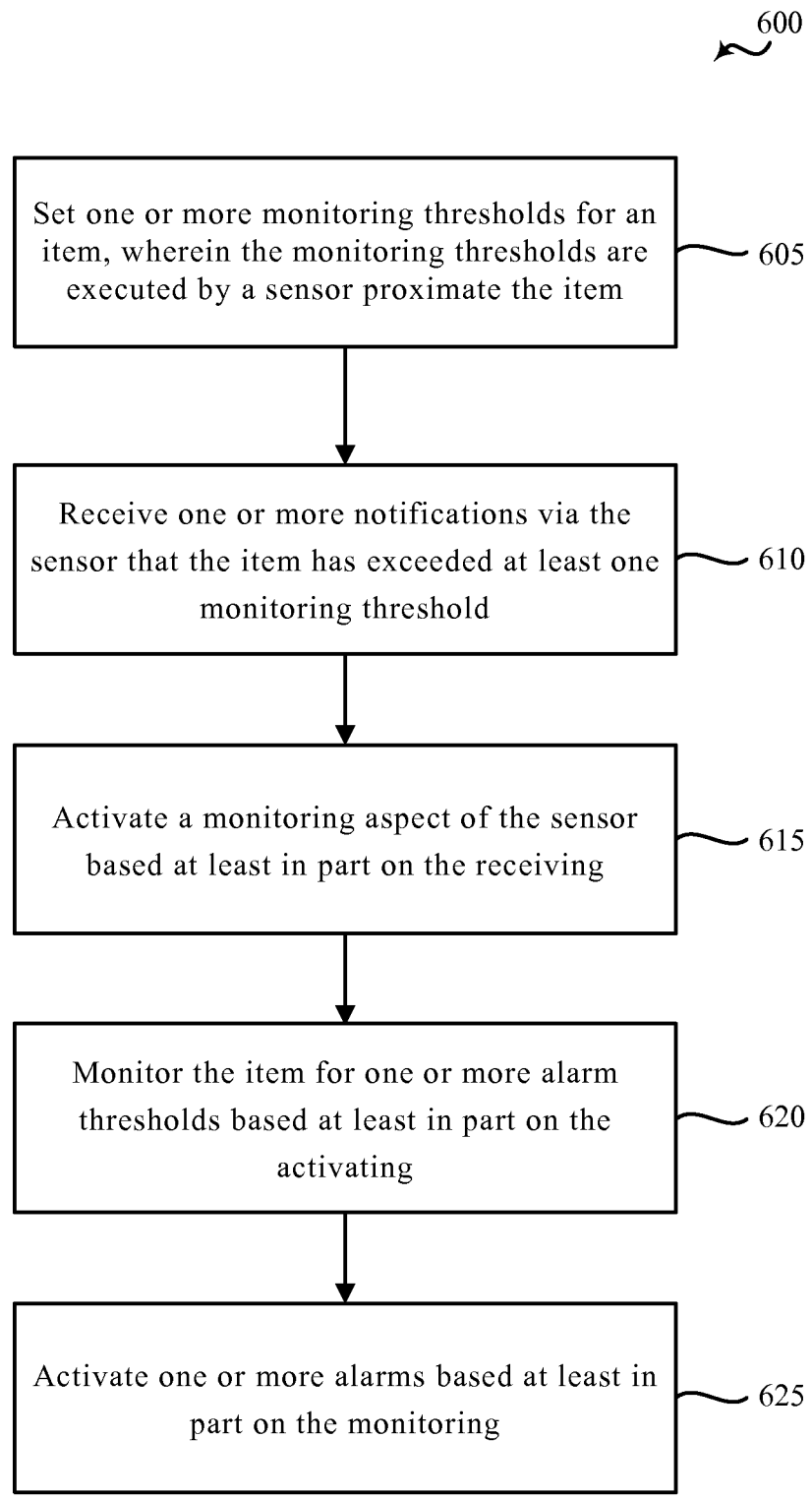
FIG. 6 is a flow chart illustrating an example of a method relating to a security and/or an automation system, in accordance with various aspects of this disclosure.

FIG. 6 is a flow chart illustrating an example of a method 600 for monitoring one or more items associated with an automation system, in accordance with various aspects of the present disclosure. For clarity, the method 600 is described below with reference to aspects of one or more of the monitoring module 215 described with reference to FIGS. 2, 3, and/or 4, and/or aspects of one or more of the systems described with reference to FIGS. 1-6. In some examples, a control panel may execute one or more sets of codes to control the functional elements to perform the functions described below. Additionally or alternatively, the sensor may perform one or more of the functions described below.

At block 605, the method 600 may include setting one or more monitoring thresholds for an item, wherein the monitoring thresholds are executed by a sensor proximate an item. The monitoring threshold(s) may be a threshold at which the sensor may attempt to link to the control panel. The monitoring threshold may be as simple as movement. In other embodiments, force of movement or continuous movement may be required. Additionally, if a dual sensor approach is used, separation of the sensors may alert the control panel. For example, a sensor may be affixed to the item to be tracked and another sensor may be proximate a storage location for the item. When the item is located at its storage location, the two sensors may align such that the sensors are able to detect one another. If the item is moved in such a way that one sensor no longer connects to the other sensor, a monitoring threshold may be exceeded and the control panel may be alerted. Additionally, in some embodiments, the sensor may detect a secure zone wherein the item is at a resting location. The secure zone may comprise a small area of square footage, such as an area surrounding a bicycle or lawnmower. The secure zone may also be a larger area, such as a home or commercial location for more mobile devices such as a laptop. The thresholds may be set at a control panel or other control aspect of the automation system and programmed into the sensor.

The operation(s) at block 605 may be performed using the threshold module 305 described with reference to FIG. 3.

At block 610, the method 600 may include receiving one or more notifications via the sensor that the item has exceeded at least one monitoring threshold. For example, if the sensor detects that it has left the secure zone, or cannot connect with a complimentary sensor, the sensor may notify the control panel and establish a link with the control panel. Additionally, the sensor may detect motion which may exceed one or more monitoring thresholds. Establishing a link with the control panel may comprise sending a first message to the control panel and waiting for confirmation of a link. The control panel may receive the request to establish a link and review the monitoring threshold to determine if a link is necessary.

The operation(s) at block 610 may be performed using the link module 310 described with reference to FIG. 3.

At block 615, the method 600 may include activating a monitoring aspect of the sensor based at least in part on the receiving. To conserve battery power, the sensor may not always be turned on or monitoring and communicating information to the control panel. Upon notification that a monitoring threshold has been exceeded, the control panel may actively monitor the location of the sensor but may only do so if a monitoring aspect of the sensor is activated. The monitoring aspect may be turning on a radio, receiving unit, running a series of code, or the like.

The operation(s) at block 615 may be performed using the link module 310 described with reference to FIG. 3.

At block 620, the method 600 may include monitoring the item for one or more alarm thresholds based at least in part on the receiving. The alarm thresholds may comprise one or more of a distance threshold, a time threshold, a movement threshold, and the like. The thresholds may provide information as to when an item is being illicitly taken. The distance threshold may comprise a distance away from the control panel. The distance threshold may also comprise a safety perimeter or home perimeter where the item may be deemed safe or in use. For example, a snow blower may usually be used in a driveway and on the grounds. Therefore, the snow blower may have a "safe" zone defined as the perimeter of the automation system. If the snow blower passes the threshold, an alarm may be activated. In some embodiments, the zone threshold may comprise a range of which the item is allowed to surpass the zone threshold. For example, a lawnmower or snow blower may sometimes exceed the boundaries of the automation system.

The operation(s) at block 620 may be performed using the tracking module 315 described with reference to FIG. 3.

At block 625, the method 600 may include activating one or more alarms based at least in part on the monitoring. For example, if one or more alarm thresholds are satisfied or exceeded, one or more alarms may be activated. The alarm may comprise an audible alarm. In some embodiments, the sensor proximate the item may be equipped with a speaker and sound an audible alarm. The alarm may also comprise an audible alarm located at the automation system. The audible alarm may be activated throughout the property or in specific locations to where the item is located. Additionally, one or more users of the automation system may receive an alarm message. The alarm message may comprise information regarding the item in question, the time of the motion, the type of alarm threshold satisfied, and the like. In some embodiments, the alarm message may also comprise a photograph of the item and a person(s) handling the item. The alarm message may solicit a response from the user. The response may be to deactivate the alarm or to contact the authorities. The user may have forgotten to disable the sensor, or may know the person handling the item and may authorize it. The user may also have no knowledge of anyone handling their belongings and may wish to notify law enforcement to follow-up on a potential theft, vandalism, or other illicit activity.

The operation(s) at block 625 may be performed using the alarm module 320 described with reference to FIG. 3.

Thus, the method 600 may provide for monitoring an item in an automation/security system. It should be noted that the method 600 is just one implementation and that the operations of the method 600 may be rearranged or otherwise modified such that other implementations are possible.

Figure 7:
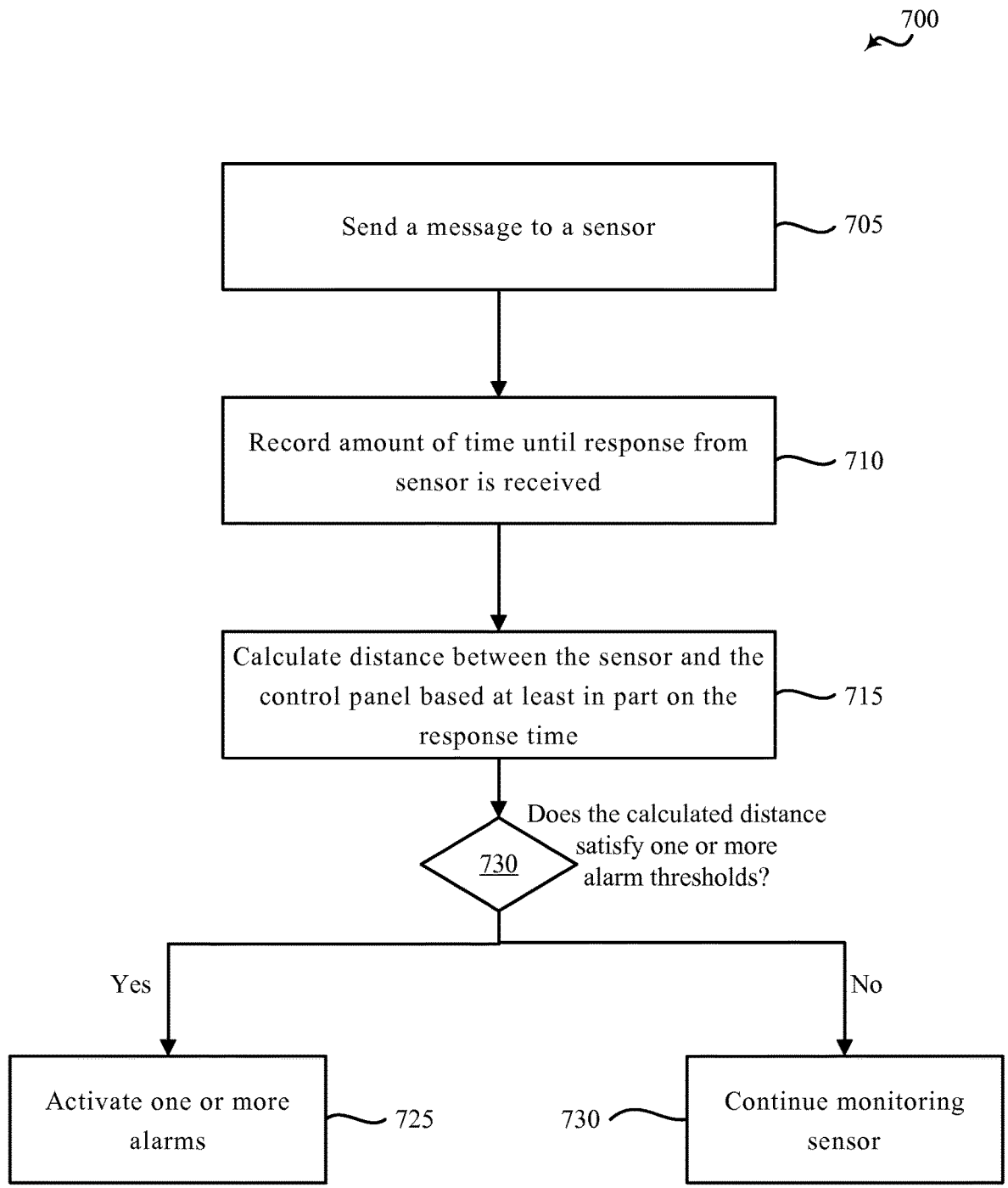
FIG. 7 is a flow chart illustrating an example of a method relating to a security and/or an automation system, in accordance with various aspects of this disclosure.

FIG. 7 is a flow chart illustrating an example of a method 700 for monitoring one or more items associated with an automation system, in accordance with various aspects of the present disclosure. For clarity, the method 700 is described below with reference to aspects of one or more of the monitoring module 215 described with reference to FIGS. 2, 3, and/or 4, and/or aspects of one or more of the systems described with reference to FIGS. 1-6. In some examples, a control panel may execute one or more sets of codes to control the functional elements to perform the functions described below. Additionally or alternatively, the sensor may perform one or more of the functions described below.

At block 705, the method 700 may include sending a message to a sensor. For example, if a sensor determines that one or more monitoring thresholds has been satisfied, the sensor may communicate such to a control panel associated with an automation system. The control panel may then begin monitoring and/or tracking the sensor and thus a potential location of the item the sensor is proximate. The control panel may begin by sending a message to the sensor. The message may require the sensor to respond with one or more pieces of information. The response may comprise GPS coordinates, motion readings, or the like. The response may also be a ping response. For example, the sensor and control panel may connect via one or more radio frequencies.

At block 710, the method 700 may comprise recording the amount of time until a response from the sensor is received. If the sensor and the control panel are communicating via radio frequencies, the radio frequencies travel at a determinable speed. The control panel may record the total amount of time it takes for a sensor to respond to a message from when the message was sent.

At block 715, the method 700 may comprise calculating a distance between the sensor and the control panel based at least in part on the response time. The control panel may use the total response time from block 710 as well as the determinable speed of the radio frequencies to calculate the total distance between the control panel and the sensor. For example, if you multiply the total response time by the determinable speed, the result will be a distance. Since the time is the total back and forth travel time, the distance may be halved. The halved distance may be an approximate distance between the sensor and the control panel.

At block 720, the method 700 may comprise determining if the calculated approximate distance satisfies one or more alarm thresholds. For example, the halved distance calculated at block 715 may be compared to one or more alarm thresholds. If the distance satisfies one or more alarm thresholds, then at block 725, one or more alarms may be activated. The alarms may comprise alarms as mentioned previously. For example, an audible alarm, a written notification to a user, contacting authorities, etc. If the distances do not satisfy one or more alarm thresholds, then at block 730, the method 700 may continue monitoring the sensor. This may comprise continuing to perform the steps of method 700 multiple times. At some point, the distance may satisfy a threshold or the item may come to rest or be returned to a safe or base location.

The operation(s) at block 705-720 and 730 may be performed using the tracking module 315 described with reference to FIG. 3. The operation(s) at block 725 may be performed using the alarm module 320 described with reference to FIG. 3.

Thus, the method 700 may provide for monitoring an item in an automation/security system. It should be noted that the method 700 is just one implementation and that the operations of the method 700 may be rearranged or otherwise modified such that other implementations are possible.

In some examples, aspects from two or more of the methods 600, 700 may be combined and/or separated. It should be noted that the methods 600, 700, are just example implementations, and that the operations of the methods 600, 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physic al locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for an automation system, comprising:
setting, by a control panel of the automation system, one or more monitoring thresholds for an item associated with a discrete structure whereat the control panel is fixed, wherein the one or more monitoring thresholds are configured to cause a sensor of the automation system to activate when a threshold of the one or more monitoring thresholds is exceeded;
communicating, by the control panel, the one or more monitoring thresholds to the sensor, wherein the sensor is proximate the item and in an inactive state that comprises a power-conserving mode until a threshold of the one or more monitoring thresholds is exceeded;
receiving, by the control panel and based at least in part on communicating the one or more monitoring thresholds, a notification via the sensor, the notification indicating that the item has exceeded the threshold and that exceeding the threshold has caused the sensor to exit the inactive state; and
activating, by the control panel and based at least in part on the notification, a monitoring aspect of the sensor to monitor the item for one or more alarm thresholds.

2. The method of claim 1, further comprising:
activating, by the control panel, one or more alarms based at least in part on monitoring the item for the one or more alarm thresholds.

3. The method of claim 1, wherein one or more of the one or more monitoring thresholds comprises a predetermined distance from the control panel.

4. The method of claim 3, further comprising:
calculating a distance between the item and the control panel.

5. The method of claim 4, further comprising:
communicating with the sensor via a radio frequency.

6. The method of claim 5, further comprising:
calculating the distance between the sensor and the control panel based on a speed of the radio frequency.

7. The method of claim 1, further comprising:
receiving Global Positioning System (GPS) information from a GPS sensor affixed to the item; and
determining if the item satisfies at least one of the one or more alarm thresholds based at least in part on the receiving.

8. The method of claim 1, wherein the one or more monitoring thresholds comprise one or more of a distance threshold, a movement threshold, or a motion threshold.

9. The method of claim 1, wherein the sensor comprises at least a user interface, a motion detection unit, and a communication unit.

10. The method of claim 2, further comprising:
contacting one or more authorities based at least in part on activating the one or more alarms.

11. The method of claim 2, further comprising:
alerting a user of the automation system based at least in part on activating the one or more alarms; and
requesting feedback from the user to deactivate the one or more alarms or contact an authority.

12. A control panel for automation systems, the control panel fixed at a discrete structure and comprising:
a processor;
memory in electronic communication with the processor; and
instructions stored in the memory, the instructions being executable by the processor to cause the control panel to:
set one or more monitoring thresholds for an item associated with the discrete structure, wherein the one or more monitoring thresholds are configured to cause a sensor of the automation system to activate when a threshold of the one or more monitoring thresholds is exceeded;
communicate the one or more monitoring thresholds to the sensor, wherein the sensor is proximate the item and in an inactive state that comprises a power-conserving mode until a threshold of the one or more monitoring thresholds is exceeded;

receive, based at least in part on communicating the one or more monitoring thresholds, a notification via the sensor, the notification indicating that the item has exceeded the threshold and that exceeding the threshold has caused the sensor to exit the inactive state; and activate, based at least in part on the notification, a monitoring aspect of the sensor to monitor the item for one or more alarm thresholds.

13. The control panel of claim 12, wherein the instructions are executable to:

activate one or more alarms based at least in part on monitoring the item for the one or more alarm thresholds.

14. The control panel of claim 12, wherein the instructions are executable to:

calculate a distance between the item and the control panel.

15. The control panel of claim 12, wherein the instructions are executable to:

receive Global Positioning System (GPS) information from a GPS sensor affixed to the item; and determine if the item satisfies at least one of the one or more alarm thresholds based at least in part on the receiving.

16. The control panel of claim 13, wherein the instructions are executable to:

alert a user of the automation system based at least in part on activating the one or more alarms; and request feedback from the user to deactivate the one or more alarms or contact an authority.

17. A non-transitory computer-readable medium storing computer-executable code for wireless communication, the code executable by a processor to:

set, by a control panel of an automation system, one or more monitoring thresholds for an item associated with a discrete structure whereat the control panel is fixed, wherein the monitoring thresholds are configured to cause a sensor of the automation system to activate when a threshold of the one or more monitoring thresholds is exceeded;

communicate, by the control panel, the one or more monitoring thresholds to the sensor, wherein the sensor is proximate the item and in an inactive state that comprises a power-conserving mode until a threshold of the one or more monitoring thresholds is exceeded;

receive, by the control panel and based at least in part on communicating the one or more monitoring thresholds, a notification via the sensor, the notification indicating that the item has exceeded the threshold and that exceeding the threshold has caused the sensor to exit the inactive state; and activate, by the control panel and based at least in part on the notification, a monitoring aspect of the sensor to monitor the item for one or more alarm thresholds.

18. The computer-readable medium of claim 17, wherein the code is executable to:

activate, by the control panel, one or more alarms based at least in part on monitoring the item for the one or more alarm thresholds.

19. The computer-readable medium of claim 17, wherein the code is executable to:

calculate a distance between the item and a control panel.

20. The computer-readable medium of claim 18, wherein the code is executable to:

alert a user of an automation system based at least in part on activating the one or more alarms; and request feedback from the user to deactivate the one or more alarms or contact an authority.

* * * * *